Dec. 13, 1932. H. L. FERRIS 1,890,980
ANIMAL STALL
Filed Dec. 10, 1930   2 Sheets-Sheet 2
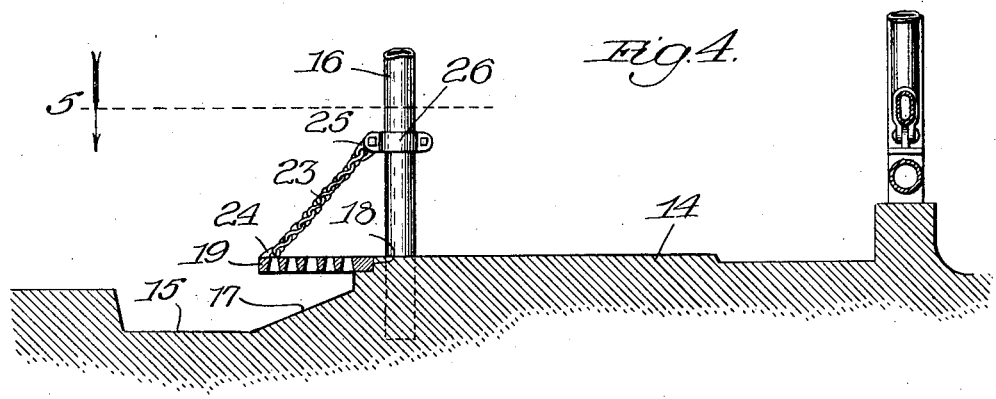
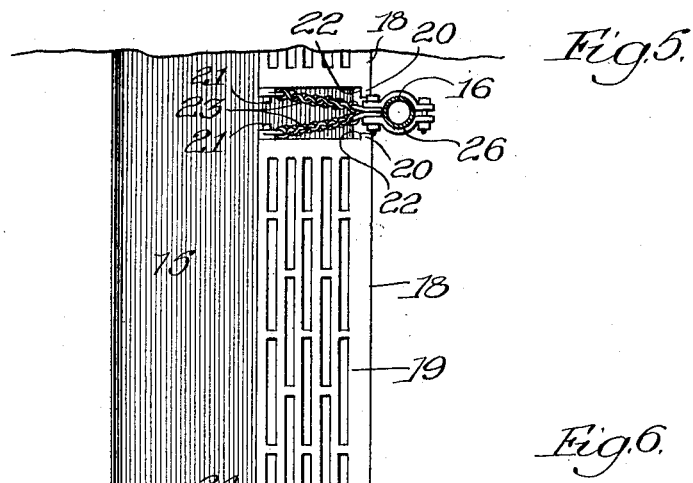
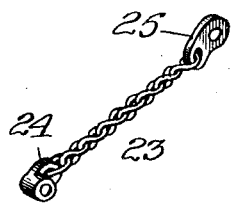
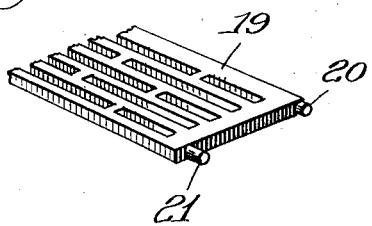
Inventor:
Henry L. Ferris,
By Dyrenforth, Lee, Chritton & Wiles,
Attys.

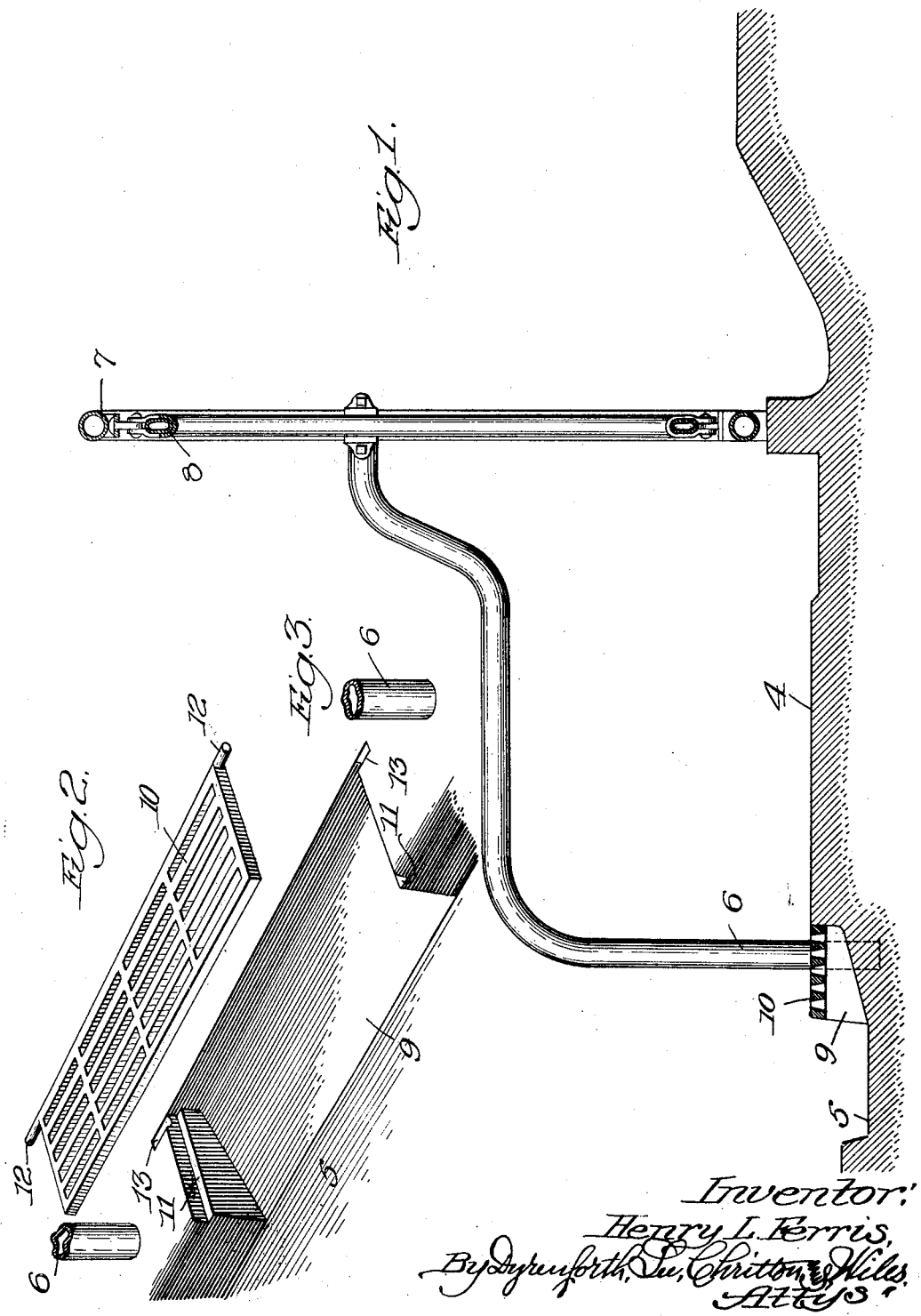

Patented Dec. 13, 1932 1,890,980

UNITED STATES PATENT OFFICE

HENRY L. FERRIS, OF HARVARD, ILLINOIS; HOWARD J. FERRIS AND EUGENE C. FERRIS, EXECUTORS OF SAID HENRY L. FERRIS, DECEASED, ASSIGNORS TO STARLINE, INC., OF HARVARD, ILLINOIS, A CORPORATION OF ILLINOIS

ANIMAL STALL

Application filed December 10, 1930. Serial No. 501,452.

My invention relates to animal stalls of the type comprising a stall-floor commonly of concrete provided along its rear edge-portion with a gutter likewise commonly of concrete for receiving the droppings from animals positioned in the stalls.

The stalls are commonly provided with stanchions in which the necks of the animals are positioned and because of the animals being of different lengths it often happens that the animals in the stalls are not properly positioned for the droppings therefrom to fall into the gutter but upon the stall floor, with the result that the animals in lying down become befouled particularly by the solid droppings and an unsanitary condition results.

My object is to provide a construction which will minimize the possibility of such unsanitary condition occurring.

Referring to the accompanying drawings:

Figure 1 is a cross-sectional view of an animal stall structure constructed in accordance with my invention.

Figure 2 is a perspective view of a grating employed at a recess in the rear edge portion of the stall floor at one of the stalls.

Figure 3 is a perspective view of the recessed rear edge of the stall floor at which the grating of Fig. 2 is located.

Figure 4 is a cross-sectional view of a modification of the stall of the preceding figures and constituting another embodiment of the invention.

Figure 5 is a broken plan view of the stall of Fig. 4.

Figure 6 is a broken perspective view of one end of one of the similar gratings employed; and Figure 7, a perspective view of one of the similar links cooperating with the gratings.

Referring to the construction shown in Figs. 1–3, it comprises a stall floor 4 as for example of concrete across the rear edge portion of which a gutter 5 is formed, the stall floor in practice being common to a plurality of stalls across the rear ends of which the gutter 5 extends.

Extending upwardly from the stall floor 4 are means defining the positioning of the animals in a row along the floor, these means, in the construction shown comprising, in accordance with common practice, partitions, two only of which are shown at 6 which separate the animals, and a stall front construction 7 extending along the front edge of the stall floor crosswise of the partitions 6 as is common practice and provided with stanchions, one only of which is shown at 8, positioned, respectively, at the front of each stall to receive the necks of the animals.

The rear edge of the floor 4 at each stall is recessed as indicated at 9 of the one stall shown, these recesses, which form lateral extensions of the gutter 5 and the bottoms of which preferably slope downwardly in a rearward direction to the plane of the bottom of the gutter 5, opening into the gutter 5, as shown, and each recess being covered at its top by a grating member 10 which preferably sets into recesses 11 in the floor at the ends of the recess 9 to extend at its upper surface substantially flush with the top surface of the floor 4. The grating-members 10 are preferably so associated with the floor that they may be swung at their rear edges upwardly and forwardly when this is desired in the operation of cleaning the recesses below them, in the construction shown each grating-member having trunnions 12 at its forward edge which rotatably seat in grooves 13 in the stall floor 4.

It will thus be understood that the gutters 5 may be so disposed that the droppings from animals of longer length when occupying stalls will fall directly into the gutter 5, and the droppings from animals of shorter length will fall upon the grating members 10 and such solid parts of the droppings as do not drop through the grating-members into the recesses 9 will, in the shifting of the hoofs of the animals along the grating-members, be forced through the gratings and thus greatly minimize retention of the droppings in such a position as to befoul the animals lying in the stalls.

The construction as provided, as will be seen, lends itself to effective and thorough cleansing of the surfaces below the grating and upon which the droppings become deposited.

The invention is also applicable to a construction in which, instead of providing a plurality of recesses, or gutter-extensions, as above described, for the stalls, a single lateral gutter-extension common to a plurality of stalls is provided; such an arrangement being shown in Figs. 4-7.

In this construction the stall floor shown at 14 has a gutter 15 extending across its rear edge portion and across the rear ends of, and common to, a plurality of the stalls as for example and preferably all of the stalls, which latter are defined as by the partitions 16 corresponding with the partitions 6 of the construction of the preceding figures.

The floor 14 at the rear edges of the stalls is recessed throughout its length, as represented at 17 to form a lateral gutter-extension which opens into the gutter 15 the bottom of the recess 17 preferably sloping downwardly in a rearward direction to the plane of the bottom of the gutter 15, and the forward edge of the lateral gutter-extension 17 being recessed, as represented at 18 adjacent each stall.

Located at the rear ends of each stall is a grating 19 extending over the gutter-extension 17, these gratings at their forward edges seating in the recesses 18.

The gratings shown are adapted to be separately displaced from the position shown to render the gutter-extension 17 below it accessible for cleaning, the gratings being provided at each end with trunnions 20 and 21 the trunnions 20 rotatably seating in notches 22 in the stall-floor. The other trunnions 21 connect with devices for supporting the gratings in operative positions, these devices being shown as comprising a section 23 of chain provided at opposite ends with blocks 24 and 25, the blocks 24 engaging the trunnions 21 and the blocks 25 clip devices 26 secured to the partitions 16.

While I have illustrated and described certain particular constructions embodying my invention, I do not wish to be understood as intending to limit it thereto, as the same may be variously modified and altered without departing from the spirit of my invention.

What I claim as new, and desire to secure by Letters Patent, is:

1. In a structure of the class described, the combination of a stall floor having a gutter extending along the rear portion thereof free from obstructions throughout substantially the full width of a stall, a grating overhanging a forward portion of said gutter, and hinge means between said floor and grating providing free bodily removal of the grating from the floor.

2. In a structure of the class described, the combination of a stall floor having a gutter extending along the rear portion thereof free from obstructions throughout its full length, a grating provided to cover a portion of the gutter, and means to support the grating in operative position.

3. In a structure of the class described, the combination of a stall floor having a gutter extending along the rear portion thereof free from obstruction throughout its full length, said gutter being formed of a flat portion and an inclined portion, a grating extending over the inclined portion, and means for supporting the grating in operative position.

4. In a structure of the class described, the combination of a floor, a plurality of stalls thereon, said floor having a gutter extending along the rear ends of the stalls, division structures separating the respective stalls, a grating extending substantially the full width of at least one of said stalls and overhanging a portion of the stall side of said gutter, hinge means between the stall edge of the grating and the floor, and means connected to a division structure to support the grating.

5. In a structure of the class described, the combination of a floor, a plurality of stalls thereon, said floor having a gutter extending along the rear ends of the stalls, division structures separating the respective stalls, a grating extending substantially the full width of at least one of said stalls and overhanging a portion of the stall side of said gutter, hinge means between the stall edge of the grating and the floor, and flexible means connecting the remaining edge of said grating with said division structures to support said last named edge free from obstruction of the gutter.

HENRY L. FERRIS.